United States Patent
Kokott et al.

(10) Patent No.: US 10,794,440 B2
(45) Date of Patent: Oct. 6, 2020

(54) INTERNALLY VENTILATED BRAKE DISK

(71) Applicant: Bayerische Motoren Werke Aktiengesellschaft, Munich (DE)

(72) Inventors: Kordian Kokott, Karlsfeld (DE); Ulf Schulz, Berlin (DE); Josef Hofstetter, Wimpasing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 159 days.

(21) Appl. No.: 16/014,946

(22) Filed: Jun. 21, 2018

(65) Prior Publication Data

US 2018/0298966 A1 Oct. 18, 2018

Related U.S. Application Data

(63) Continuation of application No. PCT/EP2016/077236, filed on Nov. 10, 2016.

(30) Foreign Application Priority Data

Dec. 22, 2015 (DE) ........................ 10 2015 226 450

(51) Int. Cl.
*F16D 65/18* (2006.01)
*F16D 65/12* (2006.01)
(Continued)

(52) U.S. Cl.
CPC .............. *F16D 65/123* (2013.01); *B21J 15/02* (2013.01); *F16B 19/06* (2013.01);
(Continued)

(58) Field of Classification Search
CPC ................................ F16D 65/12; F16D 65/128
(Continued)

(56) References Cited

U.S. PATENT DOCUMENTS 5,299,667 A * 4/1994 Hammond .............. F16D 13/64
188/218 XL
5,526,905 A * 6/1996 Shimazu ................... B60T 5/00
188/218 XL
(Continued)

FOREIGN PATENT DOCUMENTS

CN 202955158 U 5/2013
CN 105065515 A 11/2015
(Continued)

OTHER PUBLICATIONS

International Search Report (PCT/ISA/210) issued in PCT Application No. PCT/EP2016/077238 dated Jan. 24, 2017 with English translation (eight pages).
(Continued)

*Primary Examiner* — Christopher P Schwartz
(74) *Attorney, Agent, or Firm* — Crowell & Moring LLP

(57) ABSTRACT

An internally ventilated brake disk for a disk brake, includes two friction disks, which are arranged adjacent to each other and which are connected to each other by radially extending, regularly arranged webs. The webs extend from an outer peripheral edge to an inner peripheral edge of the friction disks and the friction disks are connected by the webs in such a way that intermediate spaces thereof form cooling channels of equal size, through which cooling air can flow and which are divided by further, shorter webs in such a way that at least one shorter web is located centrally between the webs in a radial region closer to the inner peripheral edge of the friction disks. Outward from the shorter web in the radial direction, the cooling channels are divided into at least three flow channels in that, in each cooling channel, two first further shorter webs are arranged at an offset to each shorter web radially outwardly and in the peripheral direction. The friction disk directed toward a brake disk hub is extended radially inward from each of the shorter webs and is pro-
(Continued)

vided with a bore in the axial direction at the height of a collar of the brake disk hub, which bore is used to hold a rivet, which fastens the friction disk to the brake disk hub.

5 Claims, 2 Drawing Sheets

(51) Int. Cl.
*B21J 15/02* (2006.01)
*F16B 19/06* (2006.01)
*F16D 65/02* (2006.01)

(52) U.S. Cl.
CPC ........... *F16D 2065/1316* (2013.01); *F16D 2065/1328* (2013.01); *F16D 2065/1344* (2013.01); *F16D 2065/1348* (2013.01); *F16D 2065/1392* (2013.01); *F16D 2200/003* (2013.01); *F16D 2200/0017* (2013.01)

(58) Field of Classification Search
USPC .................................................. 188/218 XL
See application file for complete search history.

(56) References Cited

U.S. PATENT DOCUMENTS

| | | | |
|---|---|---|---|
| 6,302,246 B1 | 10/2001 | Naumann et al. | |
| 6,367,599 B2* | 4/2002 | Kobayashi | F16D 65/128 |
| | | | 188/218 XL |
| 6,386,341 B1 | 5/2002 | Martin | |
| 7,424,938 B2* | 9/2008 | Takizawa | B62L 1/005 |
| | | | 188/18 A |
| 8,210,328 B2* | 7/2012 | Kano | F16D 65/12 |
| | | | 188/218 XL |
| 2004/0178031 A1 | 9/2004 | Gotti et al. | |
| 2005/0269174 A1 | 12/2005 | Lin | |
| 2009/0139821 A1 | 6/2009 | Koppitz et al. | |
| 2010/0101902 A1 | 4/2010 | Kano et al. | |
| 2012/0073917 A1 | 3/2012 | Lee | |
| 2014/0224603 A1 | 8/2014 | Kokott | |
| 2016/0160948 A1 | 6/2016 | Wagner et al. | |

FOREIGN PATENT DOCUMENTS

| | | |
|---|---|---|
| DE | 1 775 685 A | 9/1971 |
| DE | 198 59 840 A1 | 7/2000 |
| DE | 199 25 003 A1 | 12/2000 |
| DE | 100 32 972 A1 | 1/2002 |
| DE | 601 04 452 T2 | 8/2005 |
| DE | 10 2006 028 771 A1 | 1/2008 |
| DE | 10 2008 051 598 A1 | 4/2010 |
| DE | 10 2009 046 051 A1 | 5/2010 |
| DE | 10 2009 017 234 A1 | 10/2010 |
| DE | 10 2009 037 817 A1 | 4/2011 |
| DE | 10 2011 101 126 B3 | 10/2012 |
| DE | 10 2011 084 946 A1 | 4/2013 |
| DE | 10 2013 215 997 A1 | 2/2015 |
| DE | 10 2013 225 538 A1 | 6/2015 |
| EP | 0 872 659 A1 | 10/1998 |
| EP | 1 260 728 A1 | 11/2002 |
| GB | 142 468 A | 7/1921 |
| JP | 6-129452 A | 5/1994 |
| JP | 2010-106916 A | 5/2010 |
| JP | 2012-72904 A | 4/2012 |
| WO | WO 2015/022126 A1 | 2/2015 |

OTHER PUBLICATIONS

German-language Written Opinion (PCT/ISA/237) issued in PCT Application No. PCT/EP2016/077238 dated Jan. 24, 2017 (five pages).
German-language Search Report issued in counterpart German Application No. 10 2015 226 449.1 dated Jun. 30, 2016 with partial English translation (12 pages).
International Search Report (PCT/ISA/210) issued in PCT Application No. PCT/EP2016/077236 dated Jan. 27, 2017 with English translation (seven pages).
German-language Written Opinion (PCT/ISA/237) issued in PCT Application No. PCT/EP2016/077236 dated Jan. 27, 2017 (five pages).
German-language Search Report issued in counterpart German Application No. 10 2015 226 450.5 dated Jun. 30, 2016 with partial English translation (11 pages).
International Search Report (PCT/ISA/210) issued in PCT Application No. PCT/EP2016/077234 dated Jan. 27, 2017 with English translation (eight pages).
German-language Written Opinion (PCT/ISA/237) issued in PCT Application No. PCT/EP2016/077234 dated Jan. 27, 2017 (five pages).
German-language Search Report issued in counterpart German Application No. 10 2015 226 451.3 dated Jun. 30, 2016 with partial English translation (12 pages).
Chinese-language Office Action issued in counterpart Chinese Application No. 201680075030.6 dated Apr. 28, 2019 with English translation (14 pages).
Japanese-language Office Action issued in Japanese Application No. 2018-532748 dated May 27, 2020 with English translation (12 pages).

* cited by examiner

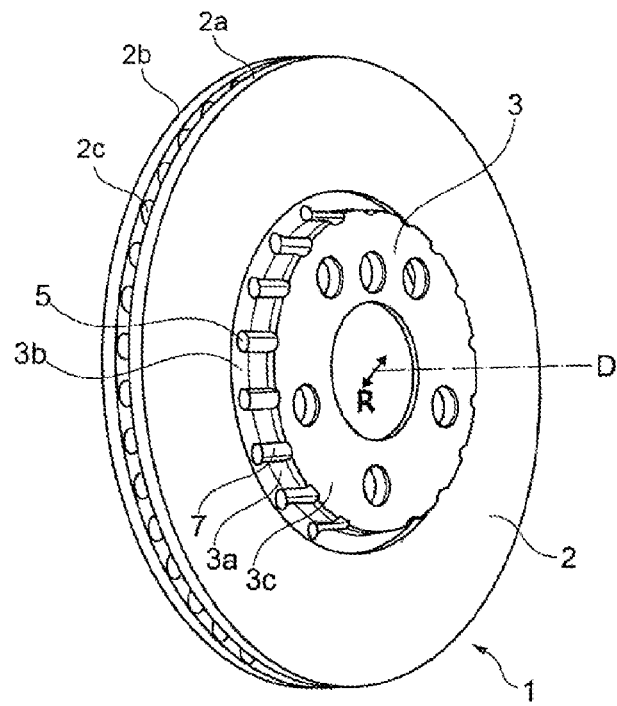
Fig. 1
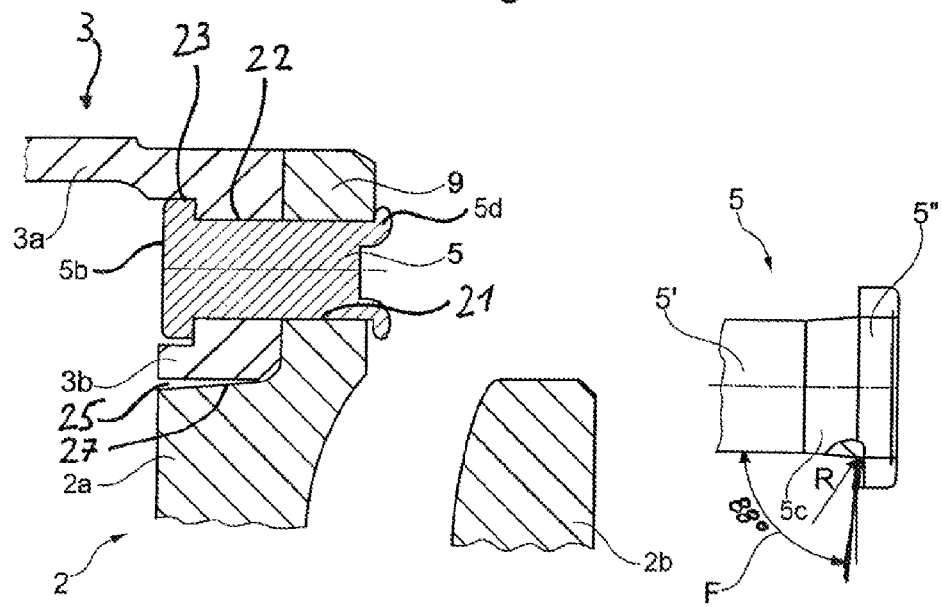
Fig. 2
Fig. 3

INTERNALLY VENTILATED BRAKE DISK

CROSS REFERENCE TO RELATED APPLICATIONS

This application is a continuation of PCT International Application No. PCT/EP2016/077236, filed Nov. 10, 2016, which claims priority under 35 U.S.C. § 119 from German Patent Application No. 10 2015 226 450.5, filed Dec. 22, 2015, the entire disklosures of which are herein expressly incorporated by reference.

This application contains subject matter related to U.S. application Ser. Nos. 16/014,913 and 16/014,958, entitled respectively "Brake Disk for Vehicles" and "Brake Disc for a Vehicle" filed on Jun. 21, 2018.

BACKGROUND AND SUMMARY OF THE INVENTION

The frictional heat which occurs on the friction elements of a wheel brake during braking operation has to be dissipated outward to the surroundings in order for the braking action to be maintained and for damage to the wheel brake to be avoided. Otherwise, repeated braking operations of a high braking force may result in a decrease in braking action, the so-called brake fading. This is undesirable, in particular during travel at high speeds and over relatively long downhill stretches.

A great amount of effort has been made on preventing overheating of the friction elements of the brake, in particular of the brake disks and brake pads. It is generally known here for the friction elements of a wheel brake to be cooled in addition, for example by relative wind being directed onto the friction elements.

For better dissipation of heat, internally ventilated brake disks are provided with radial cooling channels and/or webs, which are located between the two friction surfaces. This gives rise, while the brake disk is rotating, to a centrifugal force which causes a continuous draft of air in the outward direction from the hub, through the radial cooling openings. This assists the dissipation of heat. Despite the relatively large overall width and the relatively high weight, this brake-disk construction has been implemented for a large number of passenger vehicles. It is generally the case here that the longer the length of the radially arranged webs, the greater the distance over which the air stream is carried and the better the cooling effect as well.

Furthermore, it is possible for the frequency of the vibrations and of the bending to be altered in a specific manner by a corresponding arrangement and configuration of the webs. Consequently, if the shear stiffness of the webs is altered, then the frequency position of the vibrations also alters, as does, correspondingly, the respective level of noise produced.

In order to achieve a relatively low frequency, that is to say a relatively flexible web configuration, the webs should be relatively short in the radial direction. In order to achieve a higher frequency, the webs are thickened and therefore have a higher level of stiffness.

DE 10 2011 084 946 A1 describes a motor-vehicle brake disk which has integrated cooling channels in order for the brake disk to be cooled by air flowing therein. The webs which are necessary for this purpose here extend radially from the inner region to the outer region of the friction disks. Moreover, relatively short and relatively long webs are arranged alternately. A description is additionally given of a brake disk which has a connection between the brake-disk hub and friction ring which builds up the lowest possible level of stressing in the brake disk during braking operation.

Proceeding from this prior art, it is an object of the present invention to create an internally ventilated brake disk which is made up of the friction ring and brake-disk hub and provides an improved solution in respect of heating and cooling.

This and other objects are achieved according to the invention by an internally ventilated brake disk for a disk brake, having two adjacent friction disks, which are connected to one another by radially running, regularly arranged webs, where the webs run from an outer-circumference periphery to an inner-circumference periphery of the friction disks, and the latter are connected by the webs such that the interspaces thereof form identically sized cooling channels which can have cooling air flowing through them and which are subdivided by further, relatively shorter webs such that, in a radial region relatively close to the inner-circumference periphery of the friction disks, at least one relatively shorter web is located centrally between the webs, wherein, directed radially outward from the relatively shorter web, the cooling channels divide up into at least three flow channels, two first further relatively shorter webs being arranged in each cooling channel, in a state in which they are offset radially outward in relation to each relatively shorter web in the circumferential direction. Starting from each of the relatively shorter webs and directed radially inward, the friction disk, which is directed toward a brake-disk hub, is extended and, level with a collar of the brake-disk hub, is provided in the axial direction with a bore, which serves to accommodate a rivet. The rivet fastens the friction disk on the brake-disk hub.

Such an arrangement and configuration of cooling channels between the friction disks gives rise to a high rib density. The higher this density, the greater the cooling surface area and therefore the better the extent to which it is possible to compensate for temperature peaks which occur. This results in an optimized cooling of the brake disk. The cooling-channel arrangement, which increases the surface area provided for cooling the brake disk, thus advantageously enhances the cooling performance. The proposed practice of attaching the friction disk to the brake-disk hub by way of riveting in the axial direction via a friction disk has the advantage that interconnected brake-disk components made of materials which expand differently under the action of heat, for example in the case of a brake disk and brake-disk hub being fixed together, influence one another as little as possible.

In a further advantageous embodiment of the invention, the bore for accommodating the rivet in the collar of the brake-disk hub, said bore corresponding to the bore for accommodating the rivet in the friction disk, has a planar depression at its end which is directed away from the friction disk. The planar depression serves to accommodate a manufactured head of the rivet at least to some extent. This has the advantage that the manufactured head and brake-disk-hub collar form an essentially planar surface, and the amount of dirt and brake-lining dust adhering can therefore be reduced.

An advantageous embodiment of the invention provides for the radial distances between the relatively shorter webs and the two first further relatively shorter webs within the cooling channels to give rise to a web-free circular-ring band which has the circle center point in the center of the brake disk and is interrupted exclusively by webs. It is thus advantageously possible for flow separation on the lee side of the webs to be reduced in a very favorable manner and thus for the utilization of surface area by the air flow to be increased. It is also advantageous if the radially outer ends of webs are located on the same circle circumference in the vicinity of the outer-circumference periphery of the brake disk. This also applies to the radially inner ends of webs, which are advantageously located on the same circle circumference in the vicinity of the inner-circumference periphery of the brake disk.

Further preferred embodiments of the invention are characterized in that the friction disk, which is directed toward the brake-disk hub, has an axially directed depression for supporting the collar of the brake-disk hub. If, then, the internal diameter of the depression is greater than an external diameter of the collar, and therefore the friction disk is centered in relation to the brake-disk hub exclusively by use of the rivets, this has the advantage that, with it being possible for the support of the brake-disk hub on the friction disk to be machined to best possible effect, it is possible to provide a centering rivet connection between the two parts. This, on the one hand, allows high braking forces to be transmitted and, on the other hand, as far as the transmission of heat from the friction disk to the brake-disk hub is concerned, provides for the best possible insulation effect with, at the same time, a high degree of freedom from warping. In addition, it is advantageous if the depression fully accommodates the collar of the brake-disk hub and/or if the planar depression of the collar of the brake-disk hub fully accommodates the manufactured head of the rivet.

It is thus advantageously possible for the extension of the friction-disk surface in the inward direction as far as the lateral surface of the brake-disk hub to be of essentially planar configuration, which makes it difficult for dirt to accumulate and for water to penetrate into the connection between the brake-disk hub and friction disk.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a three-dimensional illustration of a brake disk according to an embodiment of the invention, with a view of the brake-disk hub.

FIG. 2 shows the brake disk according to FIG. 1 in an enlarged partial section (the section plane contains the axis of rotation), in a state in which it has been rotated in relation to FIG. 1 about a vertical axis located in the drawing plane, in the region where the friction disk is fastened on the brake-disk hub.

FIG. 3 shows a yet further-enlarged partial view of a rivet from FIG. 2 rotated through 180 degrees.

DETAILED DESCRIPTION OF THE DRAWINGS

Figure 4:
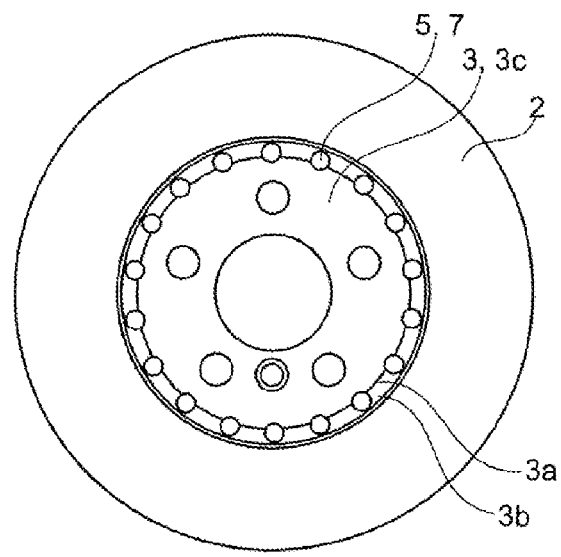
FIG. 4 is a plan view of the hub side of the brake disk.

The brake disk 1 illustrated in the figures has a brake-disk hub 3 and a friction ring 2 and is provided for installation on a wheel hub (not shown) in order to rotate therewith, during operation, about the axis of rotation D. The single-piece, internally cooled friction ring 2, which is produced from gray cast iron, includes two friction disks 2a, 2b with webs 2c which are located therebetween, and connect the friction disks to one another, for cooling-air guidance. The annular friction disk 2a, which is located closer to the brake-disk hub 3 in the axial direction, i.e. as seen in the direction of the axis of rotation D, extends radially R (as seen in relation to the axis of rotation D), by way of a so-called fastening extension 9, a certain amount further in the direction of the axis of rotation D than the other friction disk 2b, which is further away from the brake-disk hub 3 in the axial direction.

In the region of overlap between the aforementioned fastening extension 9 of the friction disk 2a and a collar 3b, which projects outward in the radial direction R from the free end of the lateral surface 3a of the brake-disk hub 3, said lateral surface being circular-cylindrical in relation to the axis of rotation D, the brake-disk hub 3 is connected to the friction disk 2a and thus to the friction ring 2, via axially extending rivets 5. In this regard, the text here (and in particular in the introductory part of the description) refers to a connection between the brake-disk hub 3 and the friction ring 2.

In the lateral surface 3a of the brake-disk hub 3, and to some extent also in the base 3c of the brake-disk hub 3, cutouts 7 are distributed uniformly over the circumference of the brake-disk hub 3. The rivets 5 project into the cutouts, i.e. the rivets 5 are placed at least to some extent therein. Each of these cutouts 7, which also form reduced-wall-thickness portions 7, extends in the axial direction around the respectively associated, likewise oriented rivet 5 and serves to accommodate the latter to some extent and/or to accommodate the set rivet 5 during installation, i.e. the connection of the brake-disk hub 3 to the friction ring 2, as can be seen in the axial direction. The cutouts 7 here are essentially in the form of a semicircular cylinder and are formed in the lateral surface 3a of the brake-disk hub 3 during casting or forging, and therefore, although said lateral surface 3a is weakened in the region of the cutouts 7, it still forms a closed wall on the inside, i.e. as seen from the axis of rotation D. Of course, through-passages in the form of bores are also provided, pretty much as an extension to the cutouts 7, in the collar 3b of the brake-disk hub 3, and the rivets 5 are fitted through these. These cutouts 7 therefore allow the rivets 5 to be arranged closer to the axis of rotation D.

Figure 5:
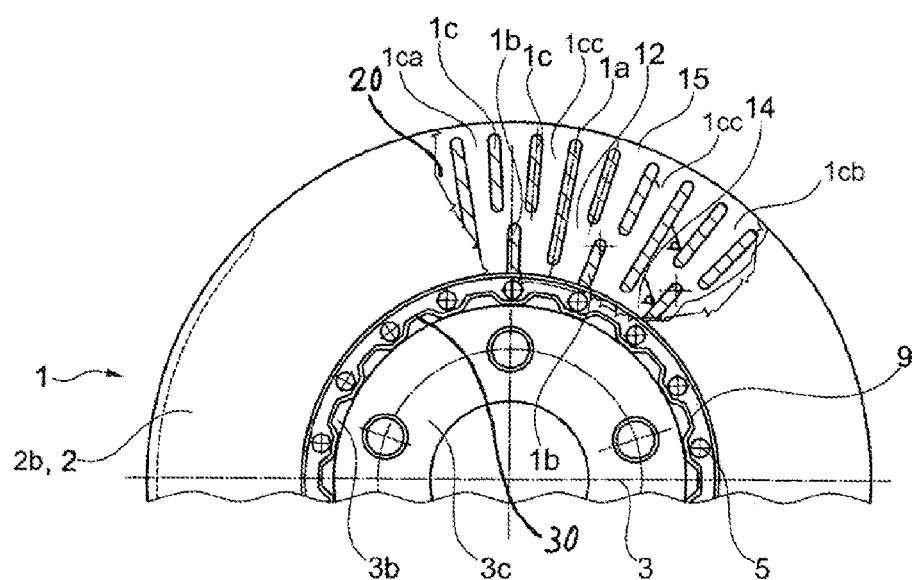
FIG. 5 is a plan view of part of the rear side of the brake disk rotated through 180 degrees in relation to FIG. 4, the connection between two friction disks via webs being illustrated by virtue of part of the friction disk being cut away.

FIG. 5 shows, on the inside of the friction disk 2a of the brake disk 1, a combination of webs 1a and relatively shorter webs 1b, 1c of the internally ventilated brake disk 1 which is repeated in a geometrically regular manner in the circumferential direction over the circular-ring surface of said friction disk. The friction disks 2a, 2b of the friction ring 2 are connected to one another via the webs 1a and the relatively shorter webs 1b, 1c, wherein the webs 1a, at the same time, bound cooling channels 20, which are repeated in a likewise geometrically regular manner in the circumferential direction over the circular-ring surfaces of the friction disks 2a, 2b. The cooling channels 20 each extend from an inner-circumference periphery 14 of the friction disks 2a, 2b at the beginning of the webs 1a as far as an outer-circumference periphery 15 of the friction disks 2a, 2b of the brake disk 1.

As seen in the circumferential direction, centrally in each cooling channel 20 between the respectively equal-length webs 1a within the friction disks 2a, 2b, the shorter web 1b extends in each case from the vicinity of the inner-circumference periphery 14 of the friction disks 2a, 2b, in the direction of the outer-circumference periphery 15 of the latter, as far as a first diameter 12 of the friction disks 2a, 2b. Proceeding therefrom, two first further shorter webs 1c, which are offset in the circumferential direction in relation to the shorter web 1b within the cooling channel 20, extend further outward in the radial direction as far as the outer-circumference periphery 15, one offset to the left, and the other offset to the right. The first further shorter webs 1c divide up the cooling channels 20, in the radially outward direction from the relatively shorter web 1b, into three flow channels 1ca, 1cb, 1cc. All the webs 1a, 1b, 1c have essentially the same web width and are rounded at the front and rear. The radially outer ends of the respective webs 1a, 1c here are located on the same circle circumference in the vicinity of the outer-circumference periphery 15, and the radially inner ends of the respective webs 1a are located on the same circle circumference in the vicinity of the inner-circumference periphery 14, of the brake disk 1. Moreover, starting from each of the relatively shorter webs 1b, the friction disk 2a, which is directed toward the brake-disk hub 3, is extended in the radially inward direction and, level with the collar 3b of the brake-disk hub 3, is provided in the axial direction with a bore 21 which serves to accommodate the rivet 5, which fastens the friction disk 2a on the brake-disk hub 3. Closing heads 5d of all the rivets 5 are located on the visible side of the fastening extension 9 of the friction disk 2a, whereas the manufactured heads 5b of the rivets 5 are fully recessed in a planar depression 23 of the collar 3b of the brake-disk hub 3, as illustrated in FIG. 2. The friction disk 2a, which is directed toward the brake-disk hub 3, likewise has an axially directed depression 27, which is intended for supporting the collar 3b of the brake-disk hub 3 and of which the internal diameter is greater than an external diameter of the collar 3b. Therefore, the friction disk 2a and the brake-disk hub 3, on account of an amount of radial play 25, are centered in relation to one another exclusively by way of the rivets 5.

FIG. 3 shows a view of part of a rivet 5 designed in the form of semitubular rivets, measuring 5 mm×13 mm, with a manufactured head 5b and a stem 5a. In the direction of the manufactured head 5b, the rivet stem 5a is designed to be conical with an increasing diameter. In the direction of the rivet stem 5a, the manufactured head 5b has an undercut, and therefore the angle designated by a double arrow F measures essentially 88 degrees. The extent of a radius R between the cone 5c of the rivet stem 5a and the undercut of the manufactured head 5b is not defined and is established by manufacturing. The cone 5c has a length of at least 1.5 mm and at most 4 mm, the diameter of the cone 5c at the manufactured head 5b being 5.33 mm. Tests have found that this rivet geometry, along with self-centering of the rivet during the operation of setting the rivet 5, results in an advantageous contact pattern with a 100% amount of contact, which gives rise to optimum centering and force transmission. In addition, the conical rivet stem 5a and the undercut F of the manufactured head 5b provide for perfect sealing of the rivet connection and, consequently, protection against corrosive media.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An internally ventilated brake disk for a disk brake, comprising:
    two adjacent friction disks, which are connected to one another by radially running, regularly arranged webs, wherein
        the webs run from an outer-circumference periphery to an inner-circumference periphery of the friction disks,
        the friction disks are connected by the webs such that interspaces thereof form identically sized cooling channels through which cooling air is flowable,
        the cooling channels are subdivided by further, relatively shorter webs such that, in a radial region relatively close to the inner-circumference periphery of the friction disks, at least one relatively shorter web is located centrally between the webs, wherein, directed radially outward from the relatively shorter web, the cooling channels divide up into at least three flow channels, two first further relatively shorter webs being arranged in each cooling channel, in a state in which they are offset radially outward in relation to each relatively shorter web in the circumferential direction,
        starting from each of the relatively shorter webs and directed radially inward, the friction disk, which is directed toward a brake-disk hub, is extended and, level with a collar of the brake-disk hub, is provided in the axial direction with a bore,
        the bore serves to accommodate a rivet, which fastens the friction disk on the brake-disk hub,
        the friction disk, which is directed toward the brake-disk hub, has an axially directed depression for supporting the collar of the brake-disk hub, and
        the internal diameter of the depression is greater than an external diameter of the collar, and therefore the friction disk and the brake-disk hub are centered in relation to one another exclusively by way of the rivets.

2. The internally ventilated brake disk as claimed in claim 1, further comprising:
    a bore in the collar of the brake-disk hub for accommodating the rivet, said bore corresponding to the bore for accommodating the rivet, has a planar depression at its end which is directed away from the friction disk, said planar depression serving to accommodate a manufactured head of the rivet at least to some extent.

3. The internally ventilated brake disk as claimed in claim 2, wherein
    the radial distances between the relatively shorter webs and the two first further relatively shorter webs within the cooling channels give rise to a circular-ring band which is free of relatively shorter webs, has a circle center point in the center of the brake disk and is interrupted exclusively by the webs.

4. The internally ventilated brake disk as claimed in claim 1, wherein
    the depression fully accommodates the collar of the brake-disk hub.

5. The internally ventilated brake disk as claimed in claim 1, wherein
    the planar depression of the collar of the brake-disk hub fully accommodates the manufactured head of the rivet.

* * * * *